United States Patent
Feng et al.

(10) Patent No.: US 12,225,881 B1
(45) Date of Patent: Feb. 18, 2025

(54) DOG TRAINING AND BARK CONTROL DEVICE

(71) Applicant: Shenzhen SmartPet Technology Co., Ltd., Guangdo (CN)

(72) Inventors: Wenjing Feng, Guangdong (CN); Junyong Zhang, Guangdong (CN)

(*) Notice: Subject to any disclaimer, the term of this patent is extended or adjusted under 35 U.S.C. 154(b) by 0 days.

(21) Appl. No.: 18/431,562

(22) Filed: Feb. 2, 2024

(30) Foreign Application Priority Data

Jan. 29, 2024 (CN) .......................... 202420215454.X

(51) Int. Cl.
*A01K 15/02* (2006.01)
(52) U.S. Cl.
CPC .................................. *A01K 15/022* (2013.01)
(58) Field of Classification Search
CPC ................................................ A01K 15/022
See application file for complete search history.

(56) References Cited

U.S. PATENT DOCUMENTS

2022/0394955 A1* 12/2022 Van Curen ........... A01K 15/023

FOREIGN PATENT DOCUMENTS

CN 208387591 U * 1/2019

\* cited by examiner

*Primary Examiner* — Daryl C Pope

(57) ABSTRACT

Disclosed are a dog training and bark control device and a dog training and bark control system, being capable of being switched among three modes: a dog training mode, a bark control mode, and a dog training and bark control mode, allowing a user to select an appropriate mode of the dog training and bark control device according to an actual need of a pet dog in different situations, thereby more flexibly responding to different training and behavior management needs, helping the user better interact with the pet, promoting the pet's healthy growth, and improving product satisfaction.

19 Claims, 8 Drawing Sheets

DOG TRAINING AND BARK CONTROL DEVICE

CROSS-REFERENCE TO RELATED APPLICATIONS

The application claims priority of Chinese patent application CN202420215454.X, filed on Jan. 29, 2024, which is incorporated herein by reference in its entireties.

TECHNICAL FIELD

The present invention relates to a technical field of pet products, in particular to a dog training and bark control device and a dog training and bark control system.

BACKGROUND ART

With an increasing number of a pet dog and people's attention to the pet dog, a demand for pet dog care and management is also increasing.

At present, there are already some devices available on the market for training and managing the pet dog. However, these devices often only provide a single training effect and cannot provide comprehensive detection and training. A user may need to purchase multiple devices or use multiple tools to meet the different needs of the pet dog, increasing the complexity and cost of raising the pet dog.

Therefore, a bark control device, dog training device, and dog training/bark control device is disclosed, providing more comprehensive training and monitoring, and being capable of considering whether an intervention or a treatment from the user is needed based on a state of the pet dog, providing more comprehensive support for a breeding of the pet dog.

SUMMARY

A main purpose of the present invention is to provide a dog training and bark control device and a dog training and bark control system, which can be switched between three modes: a dog training mode, a bark control mode, and a dog training and bark control mode, allowing a user to select an appropriate mode of the dog training and bark control device according to an actual need of a pet dog in different situations.

To solve the technical problem mentioned above, a technical scheme by the invention is provided.

A dog training and bark control device includes a dog training and bark control module, a sensing module configured for detecting a bark of a dog and obtain a detection signal, and a control module electrically connected to the sensing module and the dog training and bark control module. The dog training and bark control device have a dog training mode, a bark control mode, and a dog training and bark control mode.

In the dog training mode, the control module is used for receiving a first control signal from an external remote controller to control the dog training and bark control module to provide the dog with a first dog training stimulus.

In the bark control mode, the control module is used for controlling the dog training and bark control module to provide a first bark control stimulus to the dog based on the detection signal.

In the dog training and bark control mode, the control module is used for receiving the control signal from the remote controller to control the dog training and bark control module to provide a second dog training stimulus to the dog, and for controlling the dog training and bark control module to provide a second bark control stimulus to the dog based on the detection signal.

As an improvement of the present invention, in the dog training and bark control mode, when the control module receives the control signal from the remote controller, the control module stops receiving the detection signal or stops executing an instruction of controlling the dog training and bark control module to provide the second bark control stimulus to the dog based on the detection signal, and controls the dog training and bark control module to provide the second dog training stimulus to the dog based on the control signal.

As an improvement of the present invention, the dog training and bark control module includes at least one of a sound unit for dog training and bark control, an electrical stimulus unit for dog training and bark control, a vibration unit for dog training and bark control, and an ultrasonic unit for dog training and bark control.

As an improvement of the present invention, the dog training and bark control module includes the sound unit for dog training and bark control, the electrical stimulus unit for dog training and bark control, and the vibration unit for dog training and bark control. At least one of the first bark control stimulus, the second bark control stimulus, the first dog training stimulus and the second dog training stimulus has a first level and a second level. At the first level, at least one of the first bark control stimulus, the second bark control stimulus, the first dog training stimulus and the second dog training stimulus includes a sound stimulus and a vibration stimulus. At the second level, at least one of the first bark control stimulus, the second bark control stimulus, the first dog training stimulus and the second dog training stimulus includes a sound stimulus, a vibration stimulus, and an electrical stimulus.

As an improvement of the present invention, the sensing module includes a sound sensing unit for detecting dog barking to obtain a sound signal, and the detection signal includes the sound signal. The sensing module includes a vibration sensing unit for detecting a motion of a dog barking to obtain a motion signal, and the detection signal includes the motion signal. The control module is also used for controlling whether the dog training and bark control module provides the first bark control stimulus or the second bark control stimulus to the dog or not based on the sound signal and the motion signal.

As an improvement of the present invention, the dog training and bark control device further includes a first housing, a first display module, a first battery, and a first circuit board. The first display module is installed on the first housing, the first battery and the first circuit board are arranged in the first housing and electrically connected to each other, and the control module is arranged on the first circuit board and electrically connected to the first display module. The first display module is used for displaying an electric quantity of the first battery, a charging state of the first battery, a first icon representing the dog training mode, a second icon representing the bark control mode, and a third icon representing the dog training and bark control mode.

As an improvement of the present invention, a first groove is provided on an outer side surface of the first housing, and a first window is provided on the first groove, and the first window is in communication with an interior of the first housing, and the display module is arranged inside the first housing and at least partially placed inside the first window. The first display module includes a first lens placed inside the first groove and pasted on a bottom surface of the first groove with waterproof adhesive, and a second circuit board, a light guide plate, and a pattern substrate set inside the first housing. The light guide plate is at least partially placed inside the first window, and the pattern substrate is pasted on a side of the light guide plate near the first groove, and the second circuit board is set on a side of the light guide plate away from the first groove. The pattern substrate is equipped with a light transmitting pattern for transmitting light, and the light guide plate is equipped with a through hole at a corresponding position of the light transmitting pattern, and the second circuit board is equipped with a light source component at a corresponding position of the through hole, and a light from the light source component passes through the through hole and the light transmitting pattern in sequence, and then the light transmitting pattern is projected out from the first lens.

As an improvement of the present invention, the control module is also used for analyzing a total number of barks of a target dog within a preset time range and/or analyzing a barking state of the target dog based on the detection signal to obtain a state data of the target dog, and control a feedback of the state data to the user.

As an improvement of the present invention, the control module analyzes the barking state of the target dog, and if the sound signal matches a preset barking template, the control module determines that the sound signal is a corresponding barking state of the preset barking template, and the control module obtains the barking state corresponding to the preset barking template as the state data and controls the feedback of the state data to the user. The preset barking template includes a barking template representing at least one state of fear, hunger, alertness, anger, grievance, sadness, illness, and excitement.

A dog training and bark control system includes a dog training and bark control device, and a remote controller being connected to the dog training and bark control device for communication. The dog training and bark control device includes a dog training and bark control module, a sensing module configured for detecting dog barking to obtain a detection signal, and a control module; wherein the control module is electrically connected to the sensing module and the dog training and bark control module, and the dog training and bark control device has a dog training mode, a bark control mode and a dog training and bark control mode.

In the dog training mode, the control module is used for receiving a first control signal from the remote controller to control the dog training and bark control module to provide a dog with a first dog training stimulus.

In the bark control mode, the control module is used for controlling the dog training and bark control module to provide a first bark control stimulus to the dog based on the detection signal.

In the dog training and bark control mode, the control module is used for receiving the control signal from the remote controller to control the dog training and bark control module to provide a second dog training stimulus to the dog, and for controlling the dog training and bark control module to provide a second bark control stimulus to the dog based on the detection signal.

As an improvement of the present invention, in the dog training and bark control mode, when the control module receives the control signal from the remote controller, the control module stops receiving the detection signal or stops executing an instruction of controlling the dog training and bark control module to provide the second bark control stimulus to the dog based on the detection signal, and controls the dog training and bark control module to provide the second dog training stimulus to the dog based on the control signal.

As an improvement of the present invention, the dog training and bark control module includes at least one of a sound unit for dog training and bark control, an electrical stimulus unit for dog training and bark control, a vibration unit for dog training and bark control, and an ultrasonic unit for dog training and bark control.

As an improvement of the present invention, the dog training and bark control module includes the sound unit for dog training and bark control, the electrical stimulus unit for dog training and bark control, and the vibration unit for dog training and bark control. At least one of the first bark control stimulus, the second bark control stimulus, the first dog training stimulus and the second dog training stimulus has a first level and a second level. At the first level, at least one of the first bark control stimulus, the second bark control stimulus, the first dog training stimulus and the second dog training stimulus includes a sound stimulus and a vibration stimulus. At the second level, at least one of the first bark control stimulus, the second bark control stimulus, the first dog training stimulus and the second dog training stimulus includes a sound stimulus, a vibration stimulus, and an electrical stimulus.

As an improvement of the present invention, the sensing module includes a sound sensing unit for detecting dog barking to obtain a sound signal, and the detection signal includes the sound signal. The sensing module includes a vibration sensing unit for detecting a motion of a dog barking to obtain a motion signal, and the detection signal includes the motion signal. The control module is also used for controlling whether the dog training and bark control module provides the first bark control stimulus or the second bark control stimulus to the dog or not based on the sound signal and the motion signal.

As an improvement of the present invention, the control module is also used for analyzing a total number of barks of a target dog within a preset time range and/or analyzing a barking state of the target dog based on the detection signal to obtain a state data of the target dog and control a feedback of the state data to a user.

As an improvement of the present invention, the control module analyzes the barking state of the target dog, and if the sound signal matches a preset barking template, the control module determines that the sound signal is a corresponding barking state of the preset barking template, and the control module obtains the barking state corresponding to the preset barking template as the state data and controls the feedback of the state data to the user. The preset barking template includes a barking template representing at least one state of fear, hunger, alertness, anger, grievance, sadness, illness, and excitement.

As an improvement of the present invention, the dog training and bark control device further includes a first housing, a first display module, a first battery, and a first circuit board. The first display module is installed on the first housing, the first battery and the first circuit board are arranged in the first housing and electrically connected to each other, and the control module is arranged on the first circuit board and electrically connected to the first display module. The first display module is used for displaying an electric quantity of the first battery, a charging state of the first battery, a first icon representing the dog training mode, a second icon representing the bark control mode and a third icon representing the dog training and bark control mode.

As an improvement of the present invention, a first groove is provided on an outer side surface of the first housing, and a first window is provided on the first groove, and the first window is in communication with an interior of the first housing. The display module is arranged inside the first housing and at least partially arranged inside the first window. The first display module includes a first lens arranged inside the first groove and pasted on a bottom surface of the first groove with waterproof adhesive, and a second circuit board, a light guide plate, and a pattern substrate arranged inside the first housing. The light guide plate is at least partially arranged inside the first window, and the pattern substrate is pasted on a side of the light guide plate near the first groove, and the second circuit board is arranged on a side of the light guide plate away from the first groove. The pattern substrate is equipped with a light transmitting pattern for transmitting light, and the light guide plate is provided with a through hole at a corresponding position of the light transmitting pattern, and the second circuit board is equipped with a light source component at a corresponding position of the through hole, and a light from the light source component passes through the through hole and the light transmitting pattern in sequence, and then the light transmitting pattern is projected out from the first lens.

As an improvement of the present invention, the remote controller further includes a second housing, a second display module, a second battery, and a third circuit board. The second display module is installed on the second housing, and the second battery and the third circuit board are arranged in the second housing and electrically connected to each other, and the second control module is arranged on the third circuit board and electrically connected to the second display module, and the second display module is used for displaying an electric quantity of the second battery, a charging state of the second battery, a fourth icon representing the dog training mode, a fifth icon representing the bark control mode, and a sixth icon representing the dog training and bark control mode. A second groove is provided on an outer side surface of the second housing, and a second window being in communication with an interior of the second housing is provided on the second groove, and the display module is provided inside the second housing and at least partially placed inside the second window.

As an improvement of the present invention, the second display module includes a second lens arranged in the second groove and pasted on a bottom surface of the second groove with waterproof adhesive, a display screen and a backlight board arranged in the second housing. The second lens, the display screen and the backlight board are arranged in sequence from top to bottom. A light from the backlight board projects a pattern out from the second lens through the display screen.

As an improvement of the present invention, the remote controller further includes a plurality of functional buttons, and both an upper side and a lower side of the third circuit board are equipped with the functional buttons. The second housing is equipped with pressing members at a corresponding position of the functional buttons, with one end of the pressing members abutting against the functional buttons and the other end extending out of the outer side surface of the second housing.

As an improvement of the present invention, the remote controller will enter a sleep state if there is no operation within a first preset time value, and a current of the remote controller in the sleep state or a shutdown state is lower than a first preset current value. The dog training and bark control device will enter the sleep state if it is not triggered or operated within a second preset time value, and the current of the remote controller in the sleep state or the shutdown state is lower than a second preset current value.

Compared with prior art, the present invention effectively realizes that the dog training and bark control device is capable of being switched among three modes: the dog training mode, the bark control mode, and the dog training and bark control mode, allowing the user to select the appropriate mode of the dog training and bark control device according to the actual need of the pet dog in different situations, thereby more flexibly responding to different training and behavior management needs, helping the user better interact with the pet, promoting the healthy growth of the pet and improving product satisfaction.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
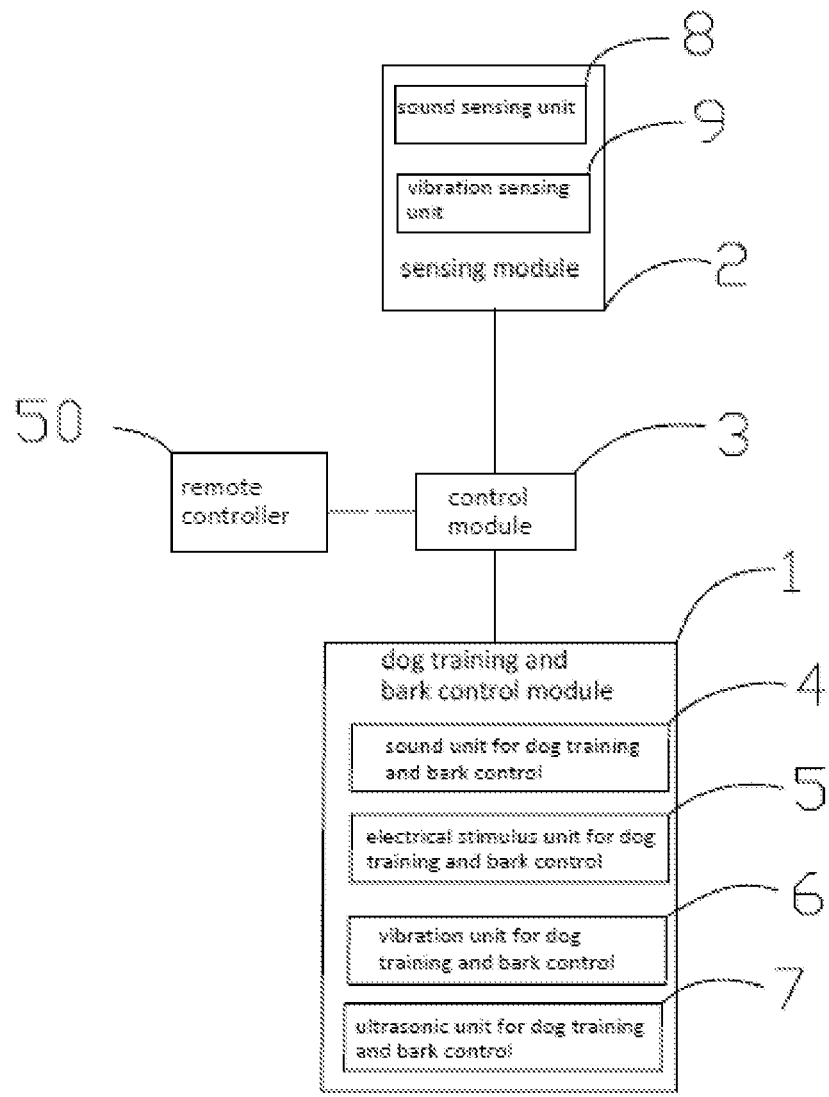
FIG. 1 is a principle block diagram according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
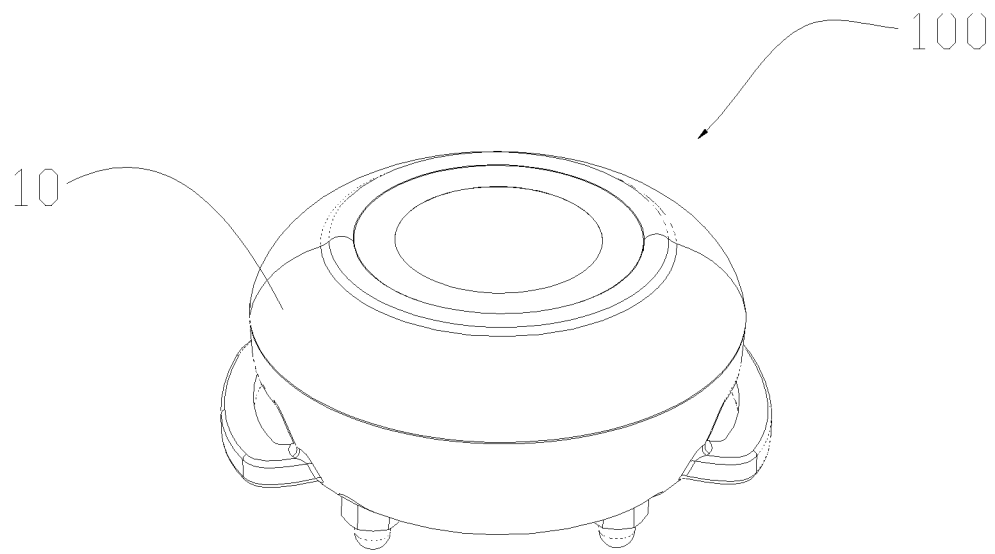
FIG. 2 is a schematic diagram of a structure of a dog training and bark control device according to the present invention.
Figure 3:
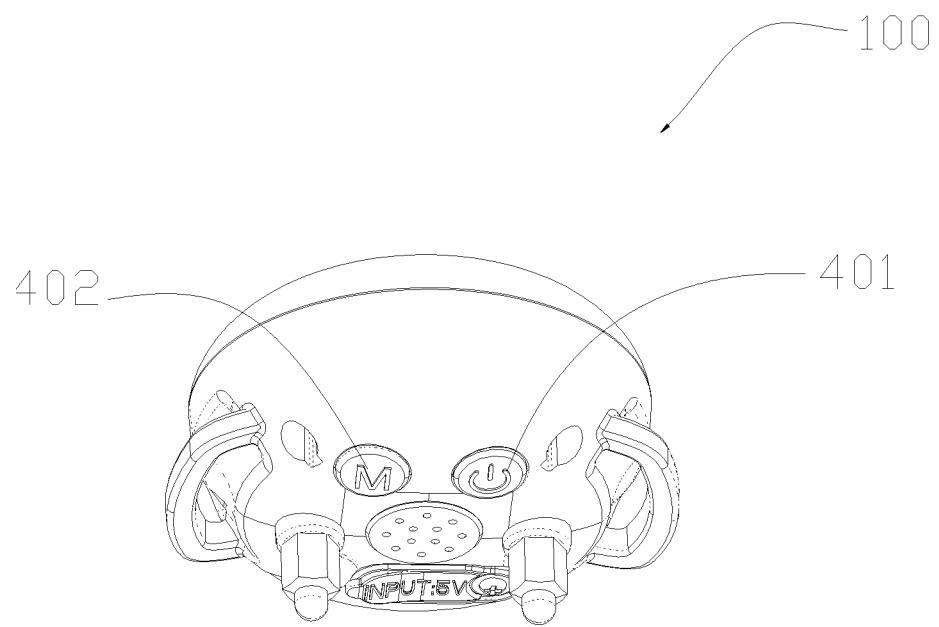
FIG. 3 is a schematic diagram of a structure of a dog training and bark control device from another perspective according to the present invention.
Figure 4:
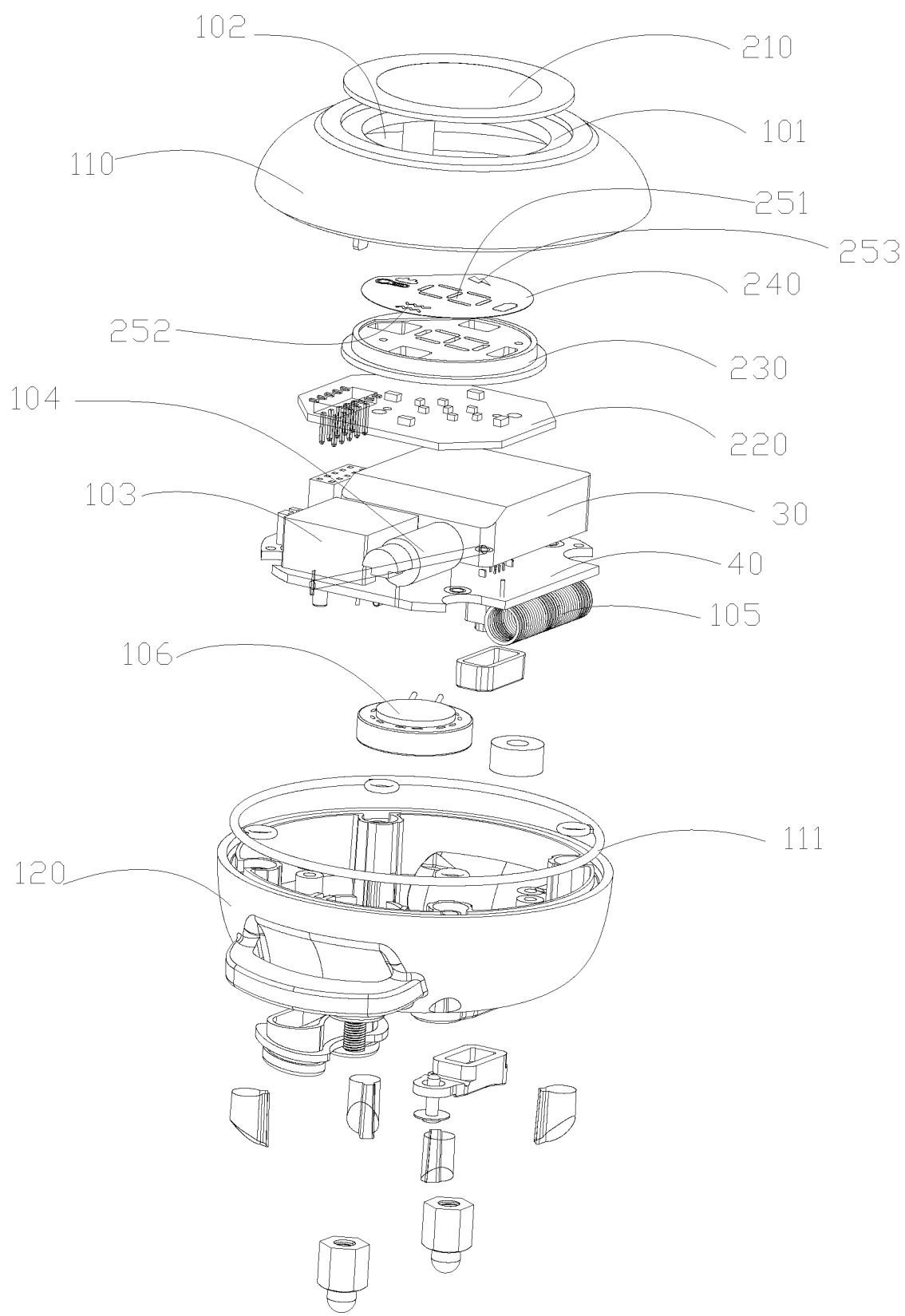
FIG. 4 is an exploded view of a dog training and bark control device according to the present invention.
Figure 5:
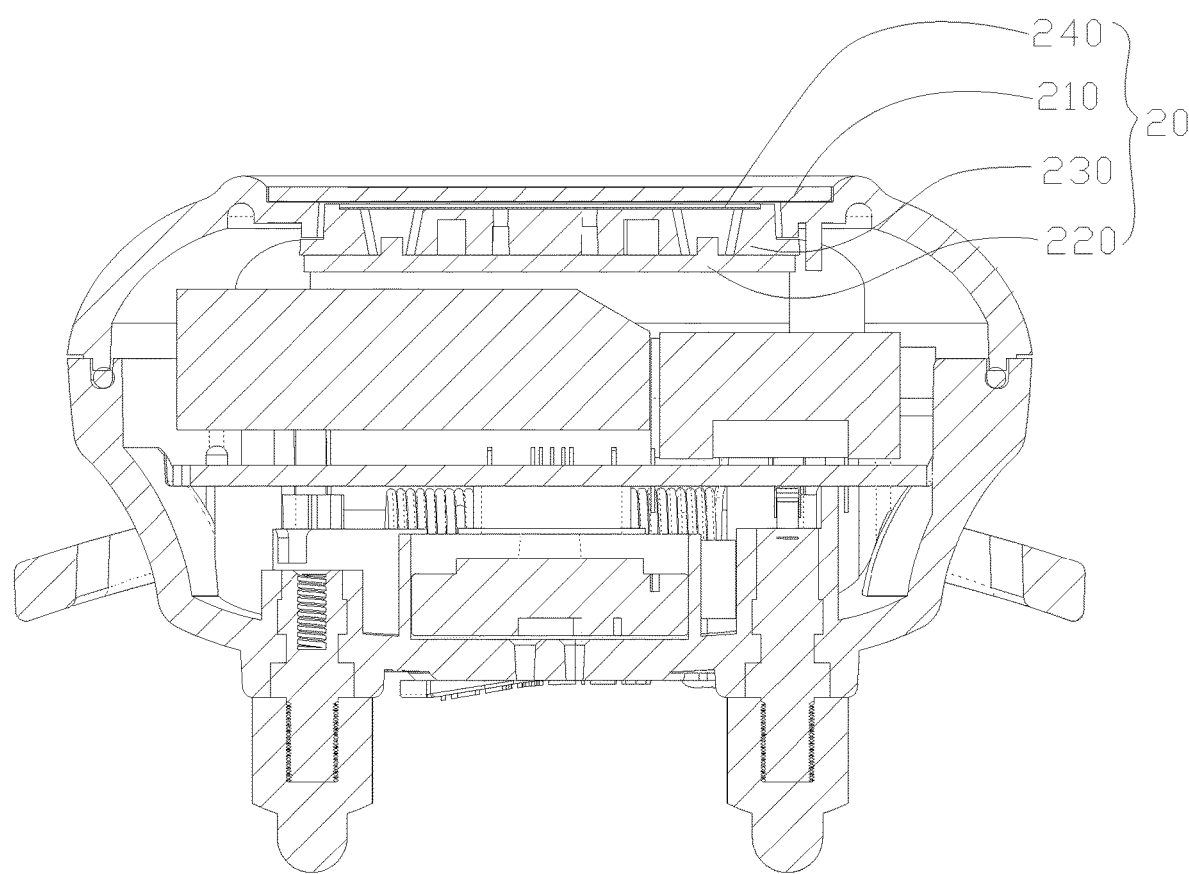
FIG. 5 is a sectional view of a dog training and bark control device according to the present invention.
Figure 6:
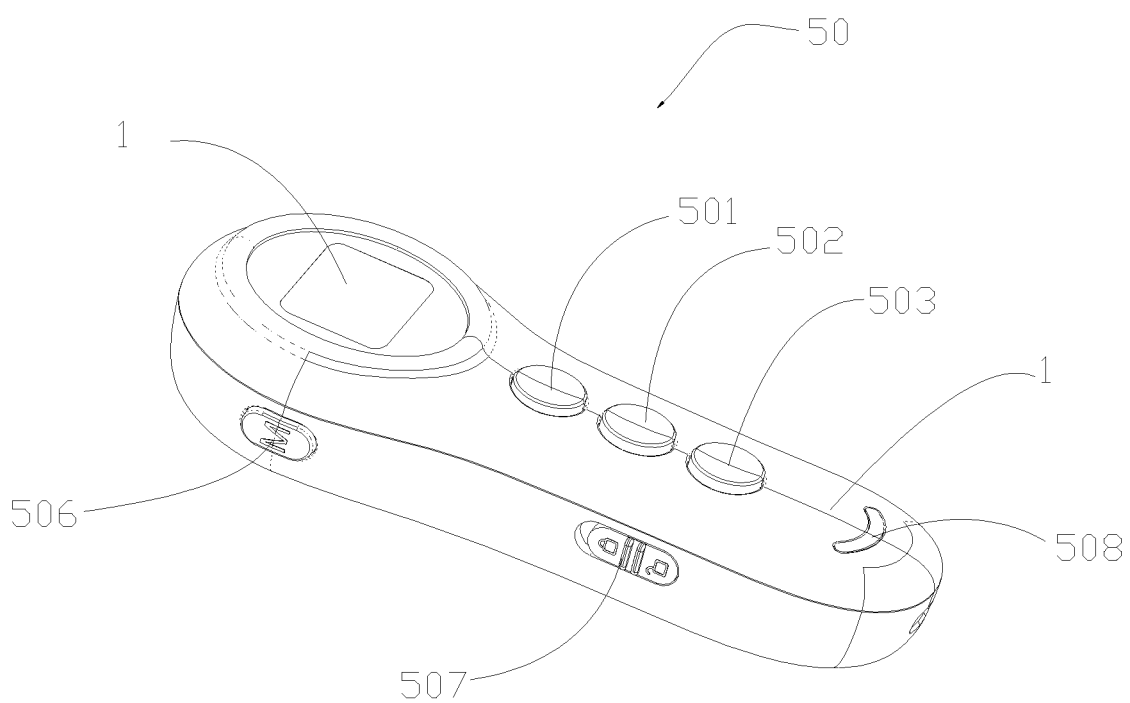
FIG. 6 is a schematic diagram of a structure of a remote controller according to the present invention.
Figure 7:
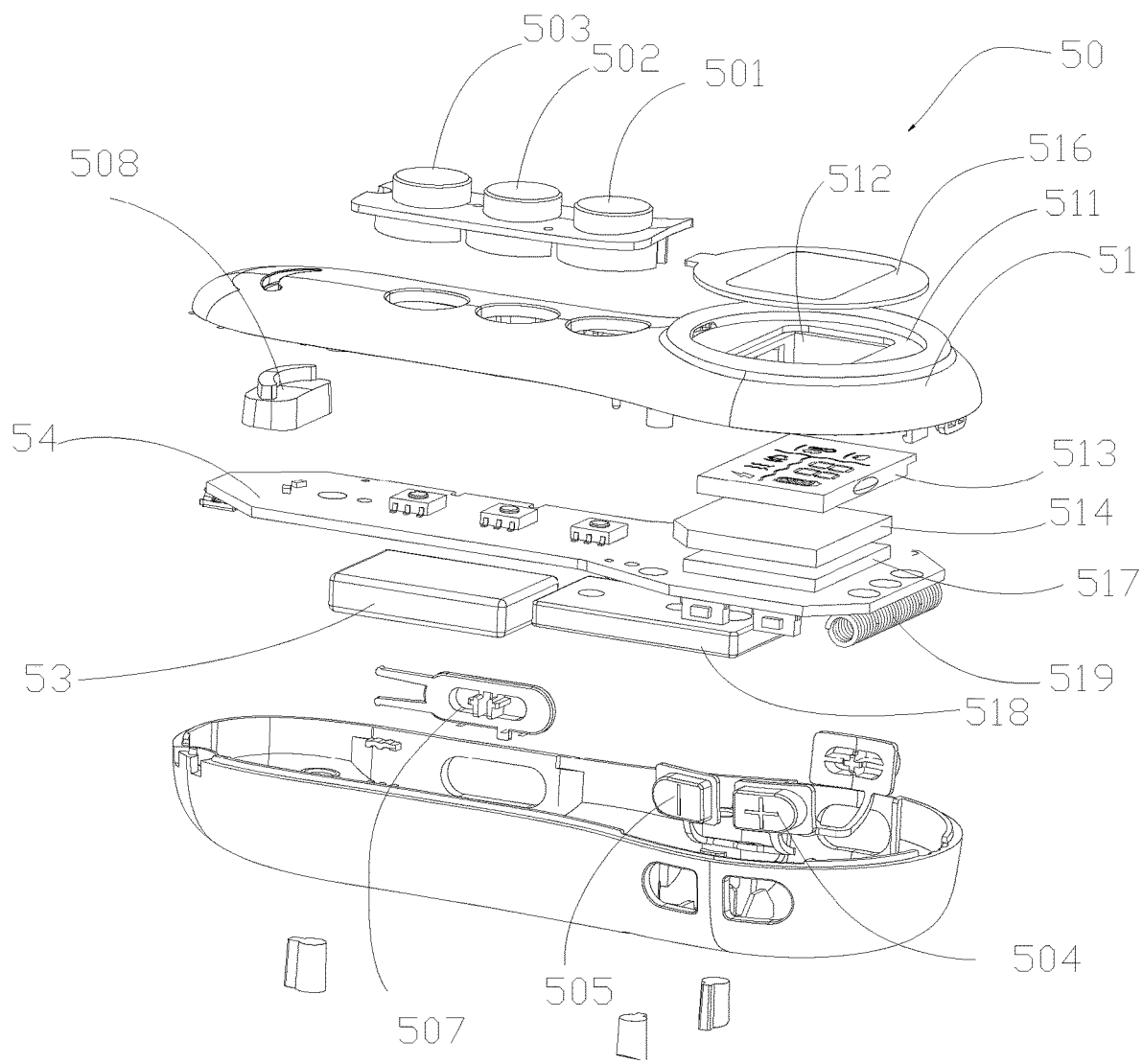
FIG. 7 is an exploded view of a remote controller according to the present invention.
Figure 8:
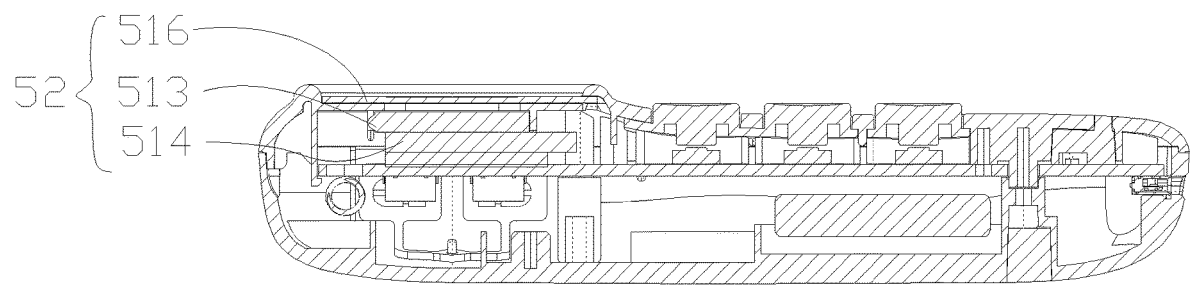
FIG. 8 is a sectional view of a remote controller according to the present invention.
Figure 9:
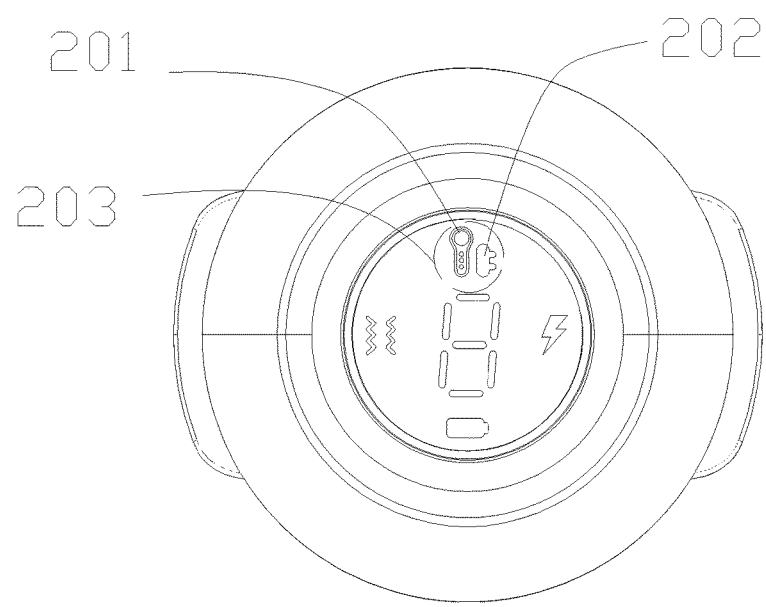
FIG. 9 is a schematic diagram of a structure of a dog training and bark control device viewed from another angle according to the present invention.
Figure 10:
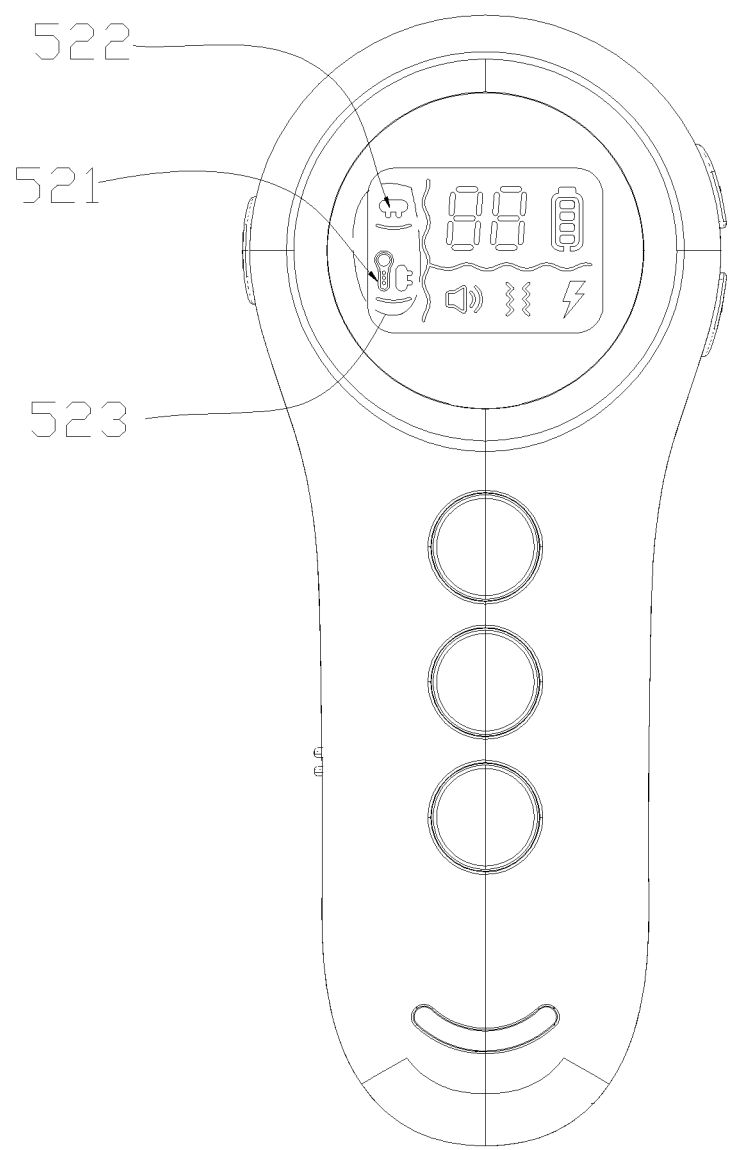
FIG. 10 is a schematic diagram of a structure of a remote controller viewed from another angle according to the present invention.

Referring to FIGS. 1-10, a dog training and bark control device 100 includes a dog training and bark control module 1, a sensing module 2 configured for detecting dog barking to obtain a detection signal, and a control module 3 electrically connected to the sensing module 2 and the dog training and bark control module 1. The dog training and bark control device 100 has a dog training mode, a bark control mode and a dog training and bark control mode.

In the dog training mode, the control module 3 is used for receiving a first control signal from an external remote controller 50 to control the dog training and bark control module 1 to provide a dog with a first dog training stimulus. At this time, the control module 3 only receives the first control signal from the external remote controller 50 and stops receiving the detection signal from the sensing module 2. Specifically, the control module 3 only receives an instruction from the remote controller to perform a dog training function and turns off a bark control function for the dog.

In the bark control mode, the control module 3 is used for controlling the dog training and bark control module 1 to provide a first bark control stimulus to the dog based on the detection signal. At this time, the control module 3 only receives the detection signal from the sensing module 2 and stops receiving the first control signal from the external remote controller 50. Specifically, the control module 3 only triggers the bark control function through a bark of the dog and stops receiving signals from the remote controller 50.

In the dog training and bark control mode, the control module 3 is used for receiving the control signal from the remote controller 50 to control the dog training and bark control module 1 to provide a second dog training stimulus to the dog, and for controlling the dog training and bark control module 1 to provide a second bark control stimulus to the dog based on the detection signal. At this time, the control module 3 can receive the first control signal from the external remote controller 50 and also receive the detection signal from the sensing module 2. Specifically, based on an order in which the control module 3 receives signals, a corresponding dog training function or a corresponding bark control function is performed on the dog in sequence. For example, when the control module 3 first receives the detection signal from the sensing module 2 and performs the bark control function, if the remote controller 50 sends the first control signal at this time, the control module 3 will stop receiving the detection signal and execute the dog training function.

Through the above structure, the dog training and bark control device 100 can be effectively switched between three modes: the dog training mode, the bark control mode, and the dog training and bark control mode. This allows a user to choose an appropriate mode of the dog training and bark control device 100 according to an actual need of a pet dog in different situations, so as to more flexibly respond to different training and behavior management needs, helping the user better interact with the pet, promoting the pet's healthy growth, and improving product satisfaction.

Furthermore, in the dog training and bark control mode, when the control module 3 receives the control signal from the remote controller 50, the control module 3 stops receiving the detection signal or strops executing an instruction of controlling the dog training and bark control module 1 to provide the second bark control stimulus to the dog based on the detection signal, and controls the dog training and bark control module 1 to provide the second dog training stimulus to the dog based on the control signal. Through the above structure, when the remote controller 50 is used for controlling the dog training and bark control device 100, the detection signal from the sensing module 2 can be prevented from interfering with the control module 3, effectively realizing the control of the remote controller 50 on the dog training and bark control device 100, thereby providing the second dog training stimulus to the dog and achieving a goal of dog training and bark control for a target dog.

In one embodiment, the dog training and bark control module 1 includes at least one of a sound unit for dog training and bark control 4, an electrical stimulus unit for dog training and bark control 5, a vibration unit for dog training and bark control 6, and an ultrasonic unit for dog training and bark control 7. Through the above structure, the dog training and bark control module 1 can realize an intervention or a treatment from the dog training and bark control device 100 to the dog through any one method of sound, current, vibration, and ultrasound. Any one of these methods can effectively train or soothe the dog, thereby better managing the dog's emotions or health.

In this embodiment, the dog training and bark control module 1 includes the sound unit for dog training and bark control 4, the electrical stimulus unit for dog training and bark control 5, and the vibration unit for dog training and bark control 6. At least one of the first bark control stimulus, the second bark control stimulus, the first dog training stimulus, and the second dog training stimulus has a first level and a second level. At the first level, at least one of the first bark control stimulus, the second bark control stimulus, the first dog training stimulus and the second dog training stimulus includes a sound stimulus and a vibration stimulus. At the second level, at least one of the first bark control stimulus, the second bark control stimulus, the first dog training stimulus, and the second dog training stimulus includes a sound stimulus, a vibration stimulus, and an electrical stimulus. Through the above structure, the dog training and bark control module 1 can realize the intervention or the treatment from the dog training and bark control device 100 to the dog through three methods: sound, current, and vibration. Moreover, since at least one of the first bark control stimulus, the second bark control stimulus, the first dog training stimulus and the second dog training stimulus has two different levels, when the user is training the dog and controlling the bark of the dog according to specific actual situations, the dog training and bark control module 1 can be used for stimulating the dog at different levels and in different ways, thereby the dog training and bark control device 100 can more effectively train and soothe the dog, so as to better manage the dog's emotions or health and improve user experience.

In this embodiment, the sensing module 2 includes a sound sensing unit 8 for detecting dog barking to obtain a sound signal, and the detection signal includes the sound signal. And the sensing module 2 includes a vibration sensing unit 9 for detecting a motion of a dog barking to obtain a motion signal, and the detection signal includes the motion signal. The control module 3 is also used for controlling whether the dog training and bark control module 1 provides the dog with the first bark control stimulus or the second bark control stimulus or not based on the sound signal and the motion signal. Through the above structure, combined with the sound sensing unit 8 and the vibration sensing unit 9, the sensing module 2 can more comprehensively detect a behavior of the target dog, allowing the control module 3 to more accurately judge a state of the pet dog to choose whether to provide the first bark control stimulus or the second bark control stimulus or not, thereby more intelligently controlling the bark control stimulus and reducing a possibility of misjudgment. This design makes the dog training and bark control device more intelligent and flexible, and can more accurately meet a training and bark control need of the pet dog, providing the user with a better user experience.

In this embodiment, the dog training and bark control device 100 further includes a first housing 10, a first display module 20, a first battery 30, and a first circuit board 40. The first display module 20 is installed on the first housing 10. The first battery 30 and the first circuit board 40 are set in the first housing 10 and electrically connected to each other. The control module 3 is set on the first circuit board 40 and electrically connected to the first display module 20. The first display module 20 is used for displaying an electric quantity of the first battery 30, a charging state of the first battery 30, a first icon 201 representing the dog training mode, a second icon 202 representing the bark control mode, and a third icon 203 representing the dog training and bark control mode. There are no special restrictions on an icon style corresponding to the first icon 201, the second icon 202, and the third icon 203. Through the above structure, the first display module 20 is electrically connected to the control module 3 and installed on the first housing 10. The user can easily observe and see an icon of a corresponding mode, thereby the user can intuitively understand a current mode information of the dog training and bark control device 100, which is convenient for the user to use, solving a problem of inconvenience for the user to perceive and affecting user experience when using different modes of dog training and bark control.

Specifically, a first groove 101 is provided on an outer side surface of the first housing 10. A first window 102 is provided on the first groove 101, and the first window 102 is in communication with an interior of the first housing 10. The display module is located inside the first housing 10 and at least partially placed inside the first window 102.

Furthermore, the first display module 20 includes a first lens 210 placed inside the first groove 101 and pasted on a bottom surface of the first groove 101 with waterproof adhesive, and a second circuit board 220, a light guide plate 230, and a pattern substrate 240 placed inside the first housing 10. The light guide plate 230 is at least partially placed inside the first window 102. The pattern substrate 240 is pasted on a side of the light guide plate 230 near the first groove 101. The second circuit board 220 is located on a side of the light guide plate 230 away from the first groove 101.

Furthermore, the pattern substrate 240 is equipped with a light transmitting pattern 250 for transmitting light. The light guide plate 230 is provided with a through hole 260 at a corresponding position of the light transmitting pattern 250. The second circuit board 220 is equipped with a light source component 270 at a corresponding position of the through hole 260. A light from the light source component 270 passes through the through hole 260 and the light transmitting pattern 250 in sequence, and then the light transmitting pattern 250 is projected out from the first lens 210.

Specifically, the first lens 210 can be an LED display screen, and the light transmitting pattern 250 includes a digital pattern 251 in a shape of an "8" for displaying a sound gear, a vibration icon 252 for displaying a vibration gear, and an electric shock icon 253 for displaying an electric shock gear. Through the above structure, the dog training and barking stop device 100 can effectively display a clear and accurate mode, making it easy for a customer to observe and use the dog training and bark control device to train or comfort the dog.

In this embodiment, the first housing 10 is also equipped with a transformer 103, a motor 104, an antenna 105, and a horn 106. The first housing 10 includes a first upper housing 110 and a first lower housing 120, and a waterproof ring 111 is also provided between the first upper housing 110 and the first lower housing 120. The first housing 10 is also equipped with a power button 401 connected to the first circuit board 40 and a first "M" button 402. The power button 401 is used for turning on or turning off the dog training and bark control device 100, and the first "M" button 402 is used for switching modes.

In this embodiment, the control module 3 is also used for analyze a total number of barks of a target dog within a preset time range and/or analyzing a barking state of the target dog based on the detection signal to obtain a state data of the target dog and control a feedback of the state data to the user. Through the above structure, the dog training and bark control device 100 effectively receives the sound signal emitted by the bark of the dog and analyzes the total number of barks of the target dog within the preset time range and/or analyzes the barking state of the target dog to obtain the state data of the target dog, and controls the feedback of the state data to the user, so that the user can know a current state of the target dog based on the state data from the respective feedback of three modes: the dog training mode, the bark control mode, and the dog training and bark control mode, and the user can consider whether the intervention or the treatment such as sick care, emotional comfort, etc. is needed or not based on the current state of the target dog, which plays an important role in ensuring a healthy breeding of the pet dog.

In this embodiment, the control module 3 analyzes the barking state of the target dog. If the sound signal matches a preset barking template, the control module 3 determines that the sound signal is a corresponding barking state of the preset barking template, and the control module 3 obtains the barking state corresponding to the preset barking template as the state data and controls the feedback of the state data to the user. The preset barking template includes a barking template representing at least one state of fear, hunger, alertness, anger, grievance, sadness, illness, and excitement. Through the above structure, analyzing the barking state can help the user monitor a health state of the dog, strengthen interaction between the user and the pet, and improve user experience. And due to the preset barking template, an effective way is provided for the control module 3 to recognize and understand the sound signal of the target dog, thereby more effectively monitoring the pet's emotions and health state.

Referring to FIGS. 1-10, a dog training and bark control system is also provided.

The dog training and bark control device 100 includes a dog training and bark control module 1, a sensing module 2 for detecting dog barking to obtain a detection signal, and a control module 3. The control module 3 is electrically connected to the sensing module 2 and the dog training and bark control module 1. The dog training and bark control device 100 has a dog training mode, a bark control mode, and a dog training and bark control mode. The remote controller 50 is connected to the dog training and bark control device 100 for communication.

In the dog training mode, the control module 3 is used for receiving a first control signal from the remote controller 50 to control the dog training and bark control module 1 to provide a dog with a first dog training stimulus. At this time, the control module 3 only receives the first control signal from the external remote controller 50 and stops receiving the detection signal from the sensing module 2. Specifically, the control module 3 only receives an instruction from the remote controller to execute a dog training function and turns off a bark control function for the dog.

In the bark control mode, the control module 3 is used for controlling the dog training and bark control module 1 to provide a first bark control stimulus to the dog based on the detection signal. At this time, the control module 3 only receives the detection signal from the sensing module 2 and stops receiving the first control signal from the external remote controller 50. Specifically, only the bark control function is triggered through the barking of the dog and stops receiving the signal from the remote controller 50.

In the dog training and bark control mode, the control module 3 is used for receiving the control signal from the remote controller 50 to control the dog training and bark control module 1 to provide a second dog training stimulus to the dog, and for controlling the dog training and bark control module 1 to provide a second bark control stimulus to the dog based on the detection signal. At this time, the control module 3 can receive the first control signal from the external remote controller 50 and also receive the detection signal from the sensing module 2. Specifically, based on an order in which the control module 3 receives signals, a corresponding dog training function or a corresponding bark control function is performed on the dog in sequence. For example, when the control module 3 first receives the detection signal from the sensing module 2 and performs the bark control function, if the remote controller 50 sends the first control signal at this time, the control module 3 will stop receiving the detection signal and execute the dog training function.

Through the above structure, the dog training and bark control device 100 can be effectively switched among three modes: the dog training mode, the bark control mode, and the dog training and bark control mode, allowing the user to select an appropriate mode of the dog training and bark control device 100 according to an actual need of the pet dog in different situations, thereby more flexibly responding to different training and behavior management needs, helping the user better interact with the pet, promoting the pet's healthy growth, and improving product satisfaction.

In this embodiment, in the dog training and bark control mode, when the control module 3 receives the control signal from the remote controller 50, the control module 3 stops receiving the detection signal or stops executing an instruction of controlling the dog training and bark control module 1 to provide the second bark control stimulus to the dog based on the detection signal, and controls the dog training and bark control module 1 to provide the second dog training stimulus to the dog based on the control signal. Through the above structure, when the remote controller 50 is used for controlling the dog training and bark control device 100, the detection signal from the sensing module 2 can be prevented from interfering with the control module 3, effectively realizing the control of the remote controller 50 on the dog training and bark control 100, thereby providing the second dog training stimulus to the dog and achieving the goal of dog training and bark control for the target dog.

In this embodiment, the dog training and bark control module 1 includes at least one of a sound unit for dog training and bark control 4, an electrical stimulus unit for dog training and bark control 5, a vibration unit for dog training and bark control 6, and an ultrasonic unit for dog training and bark control 7. Through the above structure, the dog training and bark control module 1 can realize the intervention or the treatment from the dog training and bark control device 10 to the dog through any one method of sound, current, vibration, and ultrasound. Any one of these methods can effectively train or soothe the dog, thereby better managing the dog's emotions or health.

In this embodiment, the dog training and bark control module 1 includes the sound unit for dog training and bark control 4, the electrical stimulus unit for dog training and bark control 5, and the vibration unit for dog training and bark control 6. At least one of the first bark control stimulus, the second bark control stimulus, the first dog training stimulus, and the second dog training stimulus has a first level and a second level. At the first level, at least one of the first bark control stimulus, the second bark control stimulus, the first dog training stimulus and the second dog training stimulus includes a sound stimulus and a vibration stimulus. At the second level, at least one of the first bark control stimulus, the second bark control stimulus, the first dog training stimulus, and the second dog training stimulus includes a sound stimulus, a vibration stimulus, and an electrical stimulus. Through the above structure, the dog training and bark control module 1 can realize the intervention or the treatment from the dog training and bark control device 100 to the dog through three methods: sound, current, and vibration. Moreover, since at least one of the first bark control stimulus, the second bark control stimulus, the first dog training stimulus, and the second dog training stimulus has two different levels, when the user is training the dog and controlling a bark of the dog according to specific actual situations, the user can use the dog training and bark control module 1 to stimulate the dog at different levels and in different ways, so that the dog training and bark control 100 can more effectively train or soothe the dog, thereby better managing the dog's emotions or health and improving user experience.

In this embodiment, the sensing module 2 includes a sound sensing unit 8 for detecting dog barking to obtain a sound signal, and the detection signal includes the sound signal. The sensing module 2 includes a vibration sensing unit 9 for detecting a motion of a dog to obtain a motion signal, and the detection signal includes the motion signal. The control module 3 is also used for controlling whether the dog training and bark control module 1 provides the dog with a first bark control stimulus or a second bark control stimulus or not based on the sound signal and the motion signal. Through the above structure, combined with the sound sensing unit 8 and the vibration sensing unit 9, the sensing module 2 can more comprehensively detect a behavior of the target dog, allowing the control module 3 to more accurately determine a state of the pet dog to choose whether to provide the first bark control stimulus or the second bark control stimulus or not, thereby more intelligently controlling the bark control stimulus and reducing a possibility of misjudgment. This design makes the dog training and bark control device more intelligent and flexible, and can more accurately meet dog training and bark control needs of the pet dog, providing the user with a better user experience.

In this embodiment, the control module 3 is also used for analyzing a total number of barks of a target dog within a preset time range and/or analyzing a barking state of the target dog based on the detection signal to obtain a state data of the target dog, and control a feedback of the state data to the user. Through the above structure, the dog training and bark control device 100 effectively receives the sound signal emitted by the dog's barking and analyzes the total number of barks of the target dog within the preset time range and/or analyzes the barking state of the target dog to obtain the state data of the target dog, and controls the feedback of the state data to the user, so that the user can know a current state of the target dog based on the state data from the respective feedback of three modes: the dog training mode, the bark control mode and the dog training and bark control mode, and can consider whether the intervention or the treatment from the user such as sick care, emotional comfort, etc. is needed based on the current state of the target dog, which plays an important role in ensuring a healthy breeding of the pet dog.

In this embodiment, the control module 3 analyzes the barking state of the target dog. If the sound signal matches a preset barking template, the control module 3 determines that the sound signal is a corresponding barking state of the preset barking template, and the control module 3 obtains the barking state corresponding to the preset barking template as the state data and controls the feedback of the state data to the user. The preset barking template includes a barking template representing at least one state of fear, hunger, alertness, anger, grievance, sadness, illness, and excitement. Through the above structure, analyzing the barking state can help the user monitor a health state of the dog, strengthen interaction between the user and the pet, and improve user experience. And due to the preset barking template, an effective way is provided for the control module 3 to recognize and understand the sound signal of the target dog, thereby more effectively monitoring the pet's emotions and health state.

In this embodiment, the dog training and bark control device 100 further includes a first housing 10, a first display module 20, a first battery 30, and a first circuit board 40. The first display module 20 is installed on the first housing 10. The first battery 30 and the first circuit board 40 are set in the first housing 10 and electrically connected to each other. The control module 3 is set on the first circuit board 40 and electrically connected to the first display module 20. The first display module 20 is used for displaying an electric quantity of the first battery 30, a charging state of the first battery 30, a first icon 201 representing the dog training mode, a second icon 202 representing the bark control mode, and a third icon 203 representing the dog training and bark control mode. There are no special restrictions on the icon style corresponding to the first icon 201, the second icon 202, and the third icon 203. Through the above structure, analyzing the barking state can help the user monitor the health state of the dog, strengthen interaction between the user and the pet, and improve user experience. And due to the preset barking template, an effective way is provided for the control module 3 to recognize and understand the sound signal of the target dog, thereby more effectively monitoring the pet's emotions and health state.

Furthermore, a first groove 101 is provided on an outer side surface of the first housing 10, and a first window 102 is provided on the first groove 101, and the first window is in communication with an interior of the first housing. The display module is provided inside the first housing 10 and at least partially placed inside the first window 102. The first display module 20 includes a first lens 210 placed inside the first groove 101 and pasted on a bottom surface of the first groove 101 with waterproof adhesive, and a second circuit board 220, a light guide plate 230, and a pattern substrate 240 placed inside the first housing 10. The light guide plate 230 is at least partially placed inside the first window 102. The pattern substrate 240 is pasted on a side of the light guide plate 230 near the first groove 101, and the second circuit board 220 is located on a side of the light guide plate 230 away from the first groove 101. The pattern substrate 240 is equipped with a light transmitting pattern 250 for transmitting light. The light guide plate 230 is provided with a through hole 260 at a corresponding position of the light transmitting pattern 250. The second circuit board 220 is equipped with a light source component 270 at a corresponding position of the through hole 260. A light from the light source component 270 passes through the through hole 260 and the light transmitting pattern 250 in sequence, and then the light transmitting pattern 250 is projected out from the first lens 210.

Specifically, the first lens 210 can be an LED display screen. The light transmitting pattern 250 includes a digital pattern 251 in a shape of an "8" for displaying a sound gear, a vibration icon 252 for displaying a vibration gear, and an electric shock icon 253 for displaying an electric shock gear. Through the above structure, the dog training and bark control device 100 effectively display a clear and accurate mode, making it easy for a customer to observe and use the dog training and bark control device to train or soothe the dog.

In this embodiment, the first housing 10 is also equipped with a transformer 103, a motor 104, an antenna 105, and a horn 106. The first housing 10 includes a first upper housing 110 and a first lower housing 120, and a waterproof ring 111 is also provided between the first upper housing 110 and the first lower housing 120. The first housing 10 is also equipped with a power button 401 connected to the first circuit board 40 and a first "M" button 402. The power button 401 is used for turning on or turning off the dog training and bark control device 100, and the first "M" button 402 is used for switching modes.

In this embodiment, the remote controller 50 further includes a second housing 51, a second display module 52, a second battery 53, and a third circuit board 54. The second display module 52 is installed on the second housing 51. The second battery 53 and the third circuit board 54 are arranged in the second housing 51 and electrically connected to each other. The second control module 3 is arranged on the second battery 54 and electrically connected to the second display module 52. The second display module 52 is used for displaying an electric quantity of the second battery 53, a charging state of the second battery 53, a fourth icon 521 representing the dog training mode, a fifth icon 522 representing the bark control mode, and a sixth icon 523 representing the dog training and bark control mode. There are no special restrictions on an icon style of the fourth icon 521, the fifth icon 522, and the sixth icon 523.

Furthermore, a second groove 511 is provided on an outer side surface of the second housing 51, and a second window 512 being in communication with an inside of the second housing 51 is provided on the second groove 511. The display module is located inside the second housing 51 and at least partially placed inside the second window 512. The second display module 52 includes a second lens 512 placed inside the second groove 511 and pasted on a bottom surface of the second groove 511 with waterproof adhesive, a display screen 513 and a backlight plate 514 arranged inside the second housing 51. The second lens 516, the display screen 513 and the backlight plate 514 are arranged from top to bottom in sequence. A light from the backlight plate 514 projects a pattern out from the second lens 516 through the display screen 513. Specifically, the display screen 513 is an LCD display screen. Through the above structure, the remote controller 50 effectively display a clear and accurate mode, making it easy for a customer to observe and use the dog training and bark control device to train or soothe the dog.

In this embodiment, the second housing 51 is further equipped with a backlight board cotton 517, a counterweight block 518, and an antenna 519. Furthermore, the remote controller 50 further includes a plurality of functional buttons. Both an upper side and a lower side of the second battery 54 are equipped with functional buttons. The second housing 51 is equipped with pressing members at a corresponding position of the functional buttons. One end of the pressing members abuts against the functional buttons, and the other end extends out of an outer side surface of the second housing 51. The pressing members are silicone pressing members.

Specifically, the functional buttons include a sound control button 501, a vibration control button 502, an electric shock control button 503 arranged on a top surface of the remote controller 50, an upper adjustment button 504 and a lower adjustment button 505 arranged on a right side surface, a second "M" button 506 arranged on a left side surface for mode switching, a push button 507 for locking by pushing and an indicator light 508 arranged at a bottom of the remote controller 50.

In this embodiment, when the dog training and bark control system is set to the dog training mode, by short pressing/long pressing the sound control button 501, the indicator light 508 will remain on in green, the horn of the dog training and bark control device 100 will emit a "beep" sound, and a light of the "8" shaped digital pattern 251 will be always on. By short pressing/long pressing the vibration control button 502, the indicator light 508 will be always on in green, the vibration motor 104 will start working, and a light of the vibration icon 252 will be always on. By short pressing/long pressing the electric shock control button 503, the indicator light 508 will be always on in red at this time, and the electric shock icon 253 will be always lit on.

When the dog training and bark control system is switched to the bark control mode, short pressing the second "M" button 506 can switch to the bark control mode. At this time, the second display module 52 of the remote controller 50 only displays an icon and an electric quantity, and cannot adjust a sensitivity level. At this time, the dog training and bark control device 100 can automatically detect dog barking and trigger operation. There are two triggering modes, namely sound and vibration; or sound and vibration and electric shock.

When the dog training and bark control system is set to the dog training mode and bark control mode, in a no command and standby state of the remote controller 50, the dog training and bark control device 100 automatically detects sound and triggers operation, and executes a preset working mode.

In this embodiment, pairing steps between the remote controller 50 and the dog training and bark control device 100 are as follows.

In step 1, the first "M" button 402 on the dog training and bark control device 100 is long pressed, and after 2 seconds, there will be a "beep" sound representing an entering of a pending pairing state. At this time, a "fourth icon 521" on the dog training and bark control device 100 will flash.

In step 2, the vibration control button 502 of the remote controller 50 is short pressed to transmit a function signal. The dog training and bark control device 100 will give back a "beep" sound twice, indicating successful pairing. Note: after successful pairing, the dog training and bark control device 100 will light up the "fourth icon 521".

In this embodiment, when the remote controller 50 is in a charging state, the indicator light 508 flashes in green during normal charging, the indicator light 508 is always on in green when fully charged, and the indicator light 508 flashes in red alarm rapidly during high-voltage charging. When the dog training and bark control device 100 is in a charging state, a light of a battery icon flashes during normal charging, a light of the icon is always on when fully charged, and the horn makes a "beep beep beep" alarm sound during high-voltage charging.

In this embodiment, if the remote controller 50 is not operated within a first preset time value, the remote controller 50 will enter a sleep state, and a current of the remote controller 50 in the sleep state or a shutdown state is lower than a first preset current value. The dog training and bark control device 100 will enter the sleep state if it is not triggered or not operated within a second preset time value. The current of the dog training and bark control device 100 in the sleep state or the shutdown state is lower than a second preset current value. Specifically, the remote controller 50 enters the sleep state after 30 seconds of no operation. When the remote controller 50 is in the sleep state or the shutdown state, the current is less than 20 UA. When the dog training and bark control device 100 enters the sleep state after 15 seconds of no triggering or no operation, the "8" shaped digital pattern 251 flashes a light every 4 seconds. The current of the dog training and bark control device 100 in the sleep state or the shutdown state is less than 0.3 MA. The above structure helps to reduce power consumption, protect a battery, and extend a service life.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A dog training and bark control device comprising:
   a dog training and bark control module;
   a sensing module configured for detecting a bark of a dog to obtain a detection signal; and
   a control module electrically connected to the sensing module and the dog training and bark control module, the dog training and bark control device having a dog training mode, a bark control mode, and a dog training and bark control mode;

in the dog training mode, the control module being used for receiving a first control signal from an external remote controller to control the dog training and bark control module to provide a first dog training stimulus to the dog;

in the bark control mode, the control module being configured for controlling the dog training and bark control module to provide a first bark control stimulus to a dog based on the detection signal;

in the dog training and bark control mode, the control module being configured for receiving a control signal from the remote controller for controlling the dog training and bark control module to provide a second dog training stimulus to the dog, and for controlling the dog training and bark control module to provide a second bark control stimulus to the dog based on the detection signal;

wherein the control module is also used for analyzing a total number of barks of a target dog within a preset time range and/or analyzing a barking state of the target dog based on the detection signal to obtain a state data of the target dog, and control a feedback of the state data to a user.

2. The dog training and bark control device of claim 1, wherein in the dog training and bark control mode, when the control module receives the control signal from the remote controller, the control module stops receiving the detection signal or stops executing an instruction of controlling the dog training and bark control module to provide the second bark control stimulus to the dog based on the detection signal, and controls the dog training and bark control module to provide the second dog training stimulus to the dog based on the control signal.

3. The dog training and bark control device of claim 1, wherein the dog training and bark control module comprises at least one of a sound unit for dog training and bark control, an electrical stimulus unit for dog training and bark control, a vibration unit for dog training and bark control, and an ultrasonic unit for dog training and bark control.

4. The dog training and bark control device of claim 3, wherein the dog training and bark control module comprises the sound unit for dog training and bark control, the electrical stimulus unit for dog training and bark control, and the vibration unit for dog training and bark control; wherein at least one of the first bark control stimulus, the second bark control stimulus, the first dog training stimulus and the second dog training stimulus has a first level and a second level; wherein at the first level, at least one of the first bark control stimulus, the second bark control stimulus, the first dog training stimulus and the second dog training stimulus comprises a sound stimulus and a vibration stimulus; wherein at the second level, at least one of the first bark control stimulus, the second bark control stimulus, the first dog training stimulus and the second dog training stimulus comprises a sound stimulus, a vibration stimulus, and an electrical stimulus.

5. The dog training and bark control device of claim 1, wherein the sensing module comprises a sound sensing unit for detecting dog barking to obtain a sound signal, and the detection signal comprises the sound signal; wherein the sensing module comprises a vibration sensing unit for detecting a motion of a dog barking to obtain a motion signal, and the detection signal comprises the motion signal; wherein the control module is also used for controlling whether the dog training and bark control module provides the first bark control stimulus or the second bark control stimulus to the dog or not based on the sound signal and the motion signal.

6. The dog training and bark control device of claim 1, wherein the dog training and bark control device further comprises a first housing, a first display module, a first battery, and a first circuit board; wherein the first display module is installed on the first housing, the first battery and the first circuit board are arranged in the first housing and electrically connected to each other, and the control module is arranged on the first circuit board and electrically connected to the first display module; wherein the first display module is used for displaying an electric quantity of the first battery, a charging state of the first battery, a first icon representing the dog training mode, a second icon representing the bark control mode, and a third icon representing the dog training and bark control mode.

7. The dog training and bark control device of claim 6, wherein a first groove is provided on an outer side surface of the first housing, and a first window is provided on the first groove, and the first window is in communication with an interior of the first housing, and the display module is arranged inside the first housing and at least partially placed inside the first window; wherein the first display module comprises a first lens placed inside the first groove and pasted on a bottom surface of the first groove, and a second circuit board, a light guide plate, and a pattern substrate set inside the first housing; wherein the light guide plate is at least partially placed inside the first window, and the pattern substrate is pasted on a side of the light guide plate near the first groove, and the second circuit board is set on a side of the light guide plate away from the first groove; wherein the pattern substrate is equipped with a light transmitting pattern for transmitting light, and the light guide plate is equipped with a through hole at a corresponding position of the light transmitting pattern, and the second circuit board is equipped with a light source component at a corresponding position of the through hole, and a light from the light source component passes through the through hole and the light transmitting pattern in sequence, and then the light transmitting pattern is projected out from the first lens.

8. A dog training and bark control device comprising:
a dog training and bark control module;
a sensing module configured for detecting a bark of a dog to obtain a detection signal; and
a control module electrically connected to the sensing module and the dog training and bark control module, the dog training and bark control device having a dog training mode, a bark control mode, and a dog training and bark control mode;

in the dog training mode, the control module being used for receiving a first control signal from an external remote controller to control the dog training and bark control module to provide a first dog training stimulus to the dog;

in the bark control mode, the control module being configured for controlling the dog training and bark control module to provide a first bark control stimulus to a dog based on the detection signal;

in the dog training and bark control mode, the control module being configured for receiving a control signal from the remote controller for controlling the dog training and bark control module to provide a second dog training stimulus to the dog, and for controlling the dog training and bark control module to provide a second bark control stimulus to the dog based on the detection signal;

wherein the control module analyzes the barking state of the target dog, and if the sound signal matches a preset barking template, the control module determines that the sound signal is a corresponding barking state of the preset barking template, and the control module obtains the barking state corresponding to the preset barking template as the state data and controls the feedback of the state data to the user;

wherein the preset barking template comprises a barking template representing at least one state of fear, hunger, alertness, anger, grievance, sadness, illness, and excitement.

9. A dog training and bark control system comprising:

a dog training and bark control device, comprising a dog training and bark control module, a sensing module configured for detecting dog barking to obtain a detection signal, and a control module; wherein the control module is electrically connected to the sensing module and the dog training and bark control module, and the dog training and bark control device has a dog training mode, a bark control mode and a dog training and bark control mode; and a remote controller being connected to the dog training and bark control device for communication;

wherein in the dog training mode, the control module is used for receiving a first control signal from the remote controller to control the dog training and bark control module to provide a dog with a first dog training stimulus;

wherein in the bark control mode, the control module is used for controlling the dog training and bark control module to provide a first bark control stimulus to the dog based on the detection signal;

wherein in the dog training and bark control mode, the control module is used for receiving the control signal from the remote controller to control the dog training and bark control module to provide a second dog training stimulus to the dog, and for controlling the dog training and bark control module to provide a second bark control stimulus to the dog based on the detection signal;

wherein the control module analyzes the barking state of the target dog, and if the sound signal matches a preset barking template, the control module determines that the sound signal is a corresponding barking state of the preset barking template, and the control module obtains the barking state corresponding to the preset barking template as the state data and controls the feedback of the state data to the user;

wherein the preset barking template comprises a barking template representing at least one state of fear, hunger, alertness, anger, grievance, sadness, illness, and excitement.

10. The dog training and bark control system of claim 9, wherein in the dog training and bark control mode, when the control module receives the control signal from the remote controller, the control module stops receiving the detection signal or stops executing an instruction of controlling the dog training and bark control module to provide the second bark control stimulus to the dog based on the detection signal, and controls the dog training and bark control module to provide the second dog training stimulus to the dog based on the control signal.

11. The dog training and bark control system of claim 9, wherein the dog training and bark control module comprises at least one of a sound unit for dog training and bark control, an electrical stimulus unit for dog training and bark control, a vibration unit for dog training and bark control, and an ultrasonic unit for dog training and bark control.

12. The dog training and bark control system of claim 11, wherein the dog training and bark control module comprises the sound unit for dog training and bark control, the electrical stimulus unit for dog training and bark control, and the vibration unit for dog training and bark control; wherein at least one of the first bark control stimulus, the second bark control stimulus, the first dog training stimulus and the second dog training stimulus has a first level and a second level; wherein at the first level, at least one of the first bark control stimulus, the second bark control stimulus, the first dog training stimulus and the second dog training stimulus comprises a sound stimulus and a vibration stimulus; wherein at the second level, at least one of the first bark control stimulus, the second bark control stimulus, the first dog training stimulus and the second dog training stimulus comprises a sound stimulus, a vibration stimulus, and an electrical stimulus.

13. The dog training and bark control system of claim 9, wherein the sensing module comprises a sound sensing unit for detecting dog barking to obtain a sound signal, and the detection signal comprises the sound signal; wherein the sensing module comprises a vibration sensing unit for detecting a motion of a dog barking to obtain a motion signal, and the detection signal comprises the motion signal; wherein the control module is also used for controlling whether the dog training and bark control module provides the first bark control stimulus or the second bark control stimulus to the dog or not based on the sound signal and the motion signal.

14. The dog training and bark control system of claim 9, wherein the control module is also used for analyzing a total number of barks of a target dog within a preset time range and/or analyzing a barking state of the target dog based on the detection signal to obtain a state data of the target dog and control a feedback of the state data to a user.

15. The dog training and bark control system of claim 9, wherein the dog training and bark control device further comprises a first housing, a first display module, a first battery, and a first circuit board; wherein the first display module is installed on the first housing, the first battery and the first circuit board are arranged in the first housing and electrically connected to each other, and the control module is arranged on the first circuit board and electrically connected to the first display module; wherein the first display module is used for displaying an electric quantity of the first battery, a charging state of the first battery, a first icon representing the dog training mode, a second icon representing the bark control mode and a third icon representing the dog training and bark control mode.

16. The dog training and bark control system of claim 15, wherein a first groove is provided on an outer side surface of the first housing, and a first window is provided on the first groove, and the first window is in communication with an interior of the first housing; wherein the display module is arranged inside the first housing and at least partially arranged inside the first window; wherein the first display module comprises a first lens arranged inside the first groove and pasted on a bottom surface of the first groove, and a second circuit board, a light guide plate, and a pattern substrate arranged inside the first housing; wherein the light guide plate is at least partially arranged inside the first window, and the pattern substrate is pasted on a side of the light guide plate near the first groove, and the second circuit board is arranged on a side of the light guide plate away from the first groove; wherein the pattern substrate is equipped with a light transmitting pattern for transmitting light, and the light guide plate is provided with a through hole at a corresponding position of the light transmitting pattern, and the second circuit board is equipped with a light source component at a corresponding position of the through hole, and a light from the light source component passes through the through hole and the light transmitting pattern in sequence, and then the light transmitting pattern is projected out from the first lens.

17. The dog training and bark control system of claim 9, wherein the remote controller further comprises a second housing, a second display module, a second battery, and a third circuit board; wherein the second display module is installed on the second housing, and the second battery and the third circuit board are arranged in the second housing and electrically connected to each other, and the second control module is arranged on the third circuit board and electrically connected to the second display module, and the second display module is used for displaying an electric quantity of the second battery, a charging state of the second battery, a fourth icon representing the dog training mode, a fifth icon representing the bark control mode, and a sixth icon representing the dog training and bark control mode; wherein a second groove is provided on an outer side surface of the second housing, and a second window being in communication with an interior of the second housing is provided on the second groove, and the display module is provided inside the second housing and at least partially placed inside the second window; wherein the second display module comprises a second lens arranged in the second groove and pasted on a bottom surface of the second groove, a display screen and a backlight board arranged in the second housing; wherein the second lens, the display screen and the backlight board are arranged in sequence from top to bottom; wherein a light from the backlight board projects a pattern out from the second lens through the display screen; wherein the remote controller further comprises a plurality of functional buttons, and both an upper side and a lower side of the third circuit board are equipped with the functional buttons; wherein the second housing is equipped with pressing members at a corresponding position of the functional buttons, with one end of the pressing members abutting against the functional buttons and the other end extending out of the outer side surface of the second housing.

18. The dog training and bark control system of claim 9, wherein the remote controller will enter a sleep state if there is no operation within a first preset time value, and a current of the remote controller in the sleep state or a shutdown state is lower than a first preset current value; wherein the dog training and bark control device will enter the sleep state if it is not triggered or operated within a second preset time value, and the current of the dog training and bark control device in the sleep state or the shutdown state is lower than a second preset current value.

19. The dog training and bark control system of claim 9, wherein when in the bark control mode, the control module is used for controlling the dog training and bark control module to automatically provide the first bark control stimulus to the dog based on the detection signal.

\* \* \* \* \*